US010703405B2

(12) United States Patent
Kodera

(10) Patent No.: US 10,703,405 B2
(45) Date of Patent: Jul. 7, 2020

(54) STEERING CONTROL DEVICE

(71) Applicant: JTEKT CORPORATION, Osaka-shi, Osaka (JP)

(72) Inventor: Takashi Kodera, Okazaki (JP)

(73) Assignee: JTEKT CORPORATION, Osaka-shi (JP)

(*) Notice: Subject to any disclaimer, the term of this patent is extended or adjusted under 35 U.S.C. 154(b) by 346 days.

(21) Appl. No.: 15/623,531

(22) Filed: Jun. 15, 2017

(65) Prior Publication Data

US 2017/0369095 A1 Dec. 28, 2017

(30) Foreign Application Priority Data

Jun. 22, 2016 (JP) .................................. 2016-123803

(51) Int. Cl.
*B62D 6/00* (2006.01)
*B62D 5/04* (2006.01)
*B62D 15/02* (2006.01)

(52) U.S. Cl.
CPC ........... *B62D 6/008* (2013.01); *B62D 5/0412* (2013.01); *B62D 5/0421* (2013.01); *B62D 15/024* (2013.01)

(58) Field of Classification Search
CPC .... B62D 6/008; B62D 5/0412; B62D 5/0421; B62D 15/024
See application file for complete search history.

(56) References Cited

U.S. PATENT DOCUMENTS

| 9,731,751 | B2* | 8/2017 | Kawamura | ............... B62D 5/04 |
| 2002/0121402 | A1* | 9/2002 | Takeuchi | ............. B62D 5/0463 180/446 |
| 2009/0056474 | A1 | 3/2009 | Watanabe et al. | |
| 2012/0197493 | A1* | 8/2012 | Fujimoto | ............. B62D 5/0463 701/41 |
| 2013/0233639 | A1 | 9/2013 | Kodato et al. | |

(Continued)

FOREIGN PATENT DOCUMENTS

EP 1 213 204 A2 6/2002
EP 2 492 168 A1 8/2012

(Continued)

OTHER PUBLICATIONS

Dec. 7, 2017 Extended Search Report issued in European Patent Application No. 17177032.4.

(Continued)

*Primary Examiner* — Donald J Wallace
(74) *Attorney, Agent, or Firm* — Oliff PLC

(57) ABSTRACT

A steering control device that can more appropriately transmit a road-surface reaction force to a steering wheel is provided. The steering control device feedback controls a steering angle to a target steering angle that is a target value of the steering angle. The steering control device includes an estimated axial force computation circuit that computes an estimated axial force so as to reflect a road-surface reaction force in a reaction force generated by a reaction force actuator. The estimated axial force computation circuit computes the estimated axial force by causing a friction compensation amount computation circuit and an efficiency compensation gain computation circuit to compensate an initial estimated axial force computed by an initial estimated axial force computation circuit.

9 Claims, 9 Drawing Sheets

(56) References Cited

U.S. PATENT DOCUMENTS

| | | | |
|---|---|---|---|
| 2014/0032050 A1 | 1/2014 | Kim | |
| 2015/0251691 A1* | 9/2015 | Tamaizumi | B62D 5/0412 |
| | | | 701/41 |
| 2015/0353126 A1* | 12/2015 | Chai | B62D 6/008 |
| | | | 701/42 |
| 2016/0325780 A1* | 11/2016 | She | B62D 5/0472 |
| 2017/0023445 A1 | 1/2017 | Bourdrez et al. | |
| 2017/0217485 A1* | 8/2017 | Oshima | B62D 5/04 |
| 2017/0267276 A1* | 9/2017 | Kodera | B62D 5/0412 |

FOREIGN PATENT DOCUMENTS

| | | |
|---|---|---|
| EP | 2 915 722 A1 | 9/2015 |
| EP | 2 944 545 A1 | 11/2015 |
| EP | 3 187 396 A1 | 7/2017 |
| JP | 2014-148299 A | 8/2014 |
| JP | 2015-189415 A | 11/2015 |
| WO | 2013/061568 A1 | 5/2013 |
| WO | 2015/140447 A1 | 9/2015 |

OTHER PUBLICATIONS

Apr. 7, 2020 Office Action issued in Japanese Application No. 2016-123803.

\* cited by examiner

STEERING CONTROL DEVICE

INCORPORATION BY REFERENCE

The disclosure of Japanese Patent Application No. 2016-123803 filed on Jun. 22, 2016 including the specification, drawings and abstract, is incorporated herein by reference in its entirety.

BACKGROUND OF THE INVENTION

1. Field of the Invention

The present invention relates to a steering control device.

2. Description of Related Art

For example, PCT Publication No. WO 2013/061568 (WO 2013/061568 A1) discloses a steer-by-wire steering system in which a steering wheel and a steered shaft are mechanically separated from each other. The steering system described in WO 2013/061568 A1 is configured to apply a reaction force to the steering wheel on the basis of an estimated steering-rack axial force. The estimated steering-rack axial force is obtained by distributing, at a predetermined ratio, an axial force (ideal axial force) in which a road-surface reaction force transmitted from a road surface to steered wheels is not reflected and an axial force (estimated axial force) in which the road-surface reaction force transmitted to the steered wheels is reflected. This estimated steering-rack axial force is set as a target reaction-force current that is a target value of a current supplied to a reaction-force motor that applies a reaction force to the steering wheel. The reaction force to be applied to the steering wheel is controlled by feedback controlling the current supplied to the reaction-force motor to the target reaction-force current.

The estimated axial force in which the road-surface reaction force applied to the steered wheels is reflected is computed by multiplying the current flowing in a steering motor by a gain. This estimated axial force includes a friction component caused by friction in parts such as a rack shaft and the steering motor when the steered wheels are steered. Thus, in the steering system described in WO 2013/061568 A1, the friction component is computed based on a predetermined map, and the estimated axial force from which the friction component is removed is used to compute the estimated steering-rack axial force.

Efficiency of computation of the estimated axial force that is computed based on the current flowing in the steering motor differs (between normal efficiency and reverse efficiency) depending on directions of an axial force resulting from the road-surface reaction force and generated in the rack shaft and an axial force generated in the rack shaft by a torque applied from the steering motor. The reason why the normal efficiency and the reverse efficiency coexist in the steering system is because, in a steering system including a ball screw mechanism and a rack-and-pinion mechanism, there is a difference between transmission efficiency when a force is applied to the steering system on the steering wheel side and transmission efficiency when the force is applied to the steering system on the steered wheels side. Thus, a hysteresis due to the difference between the estimated axial forces is generated between the estimated axial force computed in the normal efficiency and the estimated axial force computed in the reverse efficiency. Consequently, even if the road-surface reaction force is reflected, the steering angle of the steering wheel is not independently controlled, and thus a situation may occur in which satisfactory steering feeling and satisfactory controllability cannot be obtained because of the reaction force applied to the steering wheel. Such a situation similarly occurs, not only in the steer-by-wire steering system, but also even in an electric power steering system that assists a driver in steering operation, for example, if the steering system transmits a road-surface reaction force to the steering wheel during steering operation of the driver to adjust the steering feeling or the controllability.

SUMMARY OF THE INVENTION

It is an object of the present invention to provide a steering control device that enables a road-surface reaction force to be more appropriately transmitted to a steering wheel.

A steering control device according to one aspect of the present invention is used as a controller for a steering system including an actuator configured to generate a force to be applied to a steering mechanism of a vehicle, and controls operation of the actuator. The steering control device includes: a rotation angle control circuit that feedback controls the actuator such that a rotation angle of a rotary shaft that is convertible to a steered angle of a steered wheel that changes with a steering angle of the steering wheel or operation of the steering wheel matches a target rotation angle that is a target value of the rotation angle; an estimated axial force computation circuit that computes an estimated axial force in which a road-surface reaction force transmitted from a road surface to the steered wheel is reflected; a determination circuit that determines a change in characteristic of the estimated axial force; a compensation circuit that, based on the change in characteristic of the estimated axial force, compensates the estimated axial force so as to remove influence of the change; and a target rotation angle computation circuit that computes the target rotation angle based on the estimated axial force compensated by the compensation circuit.

With this configuration, the estimated axial force is compensated by the compensation circuit, whereby the road-surface reaction force can be more appropriately reflected in the estimated axial force. Thus, the target rotation angle that is computed based on the estimated axial force is feedback controlled by the rotation angle control circuit, whereby the rotation angle can be controlled to the target rotation angle that is an angle to which the rotation angle should be set. Through this angle control, the road-surface reaction force is reflected in torque generated by the actuator. Consequently, with the torque being applied to the steering wheel, the road-surface reaction force can be more appropriately transmitted to the steering wheel. Because the road-surface reaction force is more appropriately transmitted to the steering wheel, more satisfactory steering feeling and controllability can be obtained.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A first embodiment in which a steering control device of the present invention is embodied as a control device of a steer-by-wire steering system will be described below.

Figure 1:
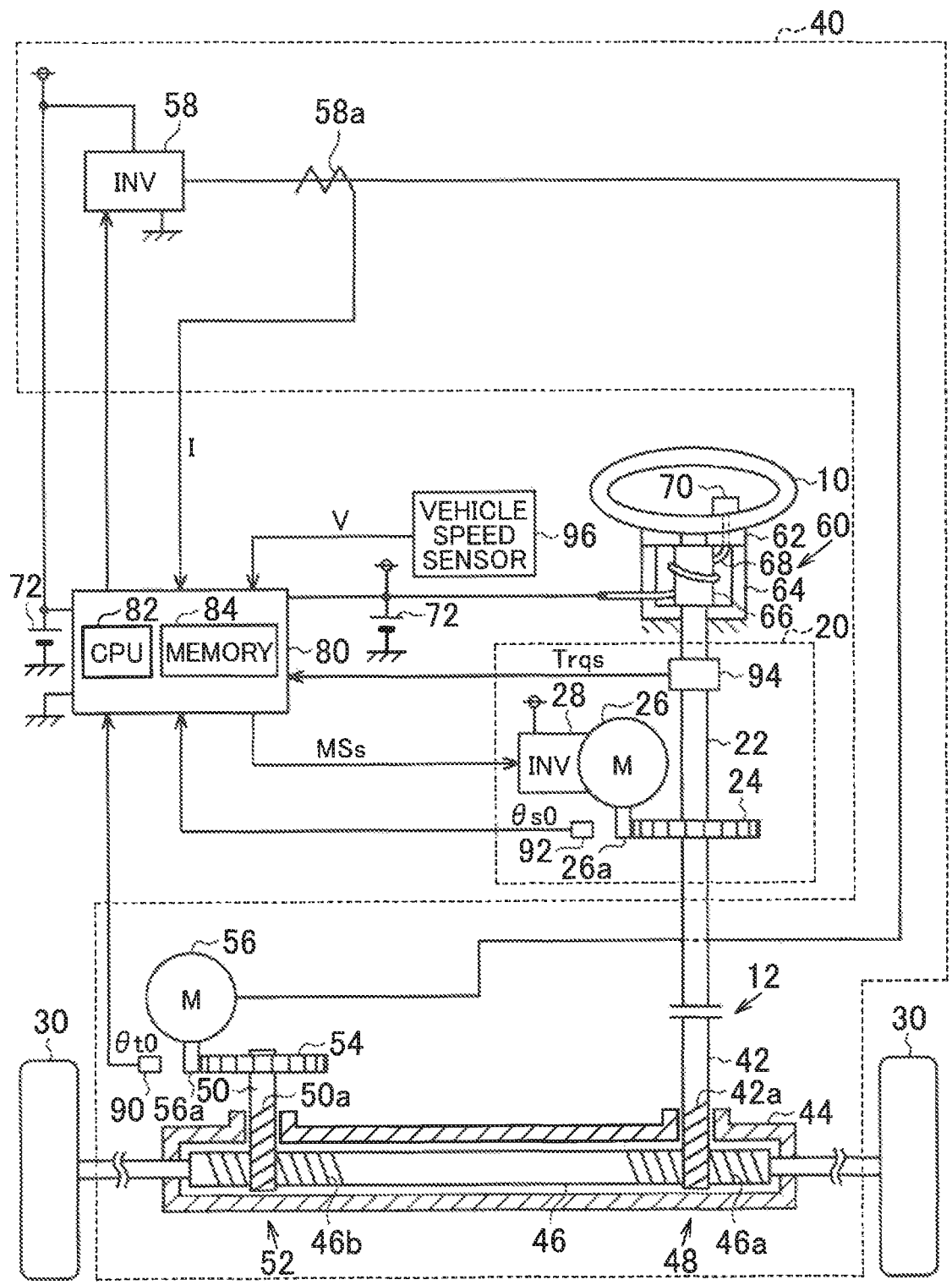
FIG. 1 is a configuration diagram illustrating a steering control device and a steering system according to a first embodiment.

As depicted in FIG. 1, the steering system includes a reaction force actuator 20 that generates a reaction force acting against operation of a steering wheel 10 and a steering actuator 40 that generates a steering force for steering steered wheels 30 in accordance with operation of the steering wheel 10. Each of the reaction force actuator 20 and the steering actuator 40 is one example of an actuator.

The reaction force actuator 20 includes a steering shaft 22 fixed to the steering wheel 10, a reaction force-side reduction gear 24, a reaction-force motor 26 having a rotary shaft 26a coupled to the reaction force-side reduction gear 24, and an inverter 28 that drives the reaction-force motor 26. The reaction-force motor 26 is a three-phase brushless motor, for example. The reaction-force motor 26 is connected to a battery 72 via the inverter 28.

The steering actuator 40 includes a first rack-and-pinion mechanism 48, a second rack-and-pinion mechanism 52, a steered-side motor 56, and an inverter 58. The first rack-and-pinion mechanism 48 includes a rack shaft 46 that extends in the lateral direction of a vehicle body and a pinion shaft 42 that is disposed so as to form a predetermined crossing angle with the rack shaft 46. Via meshing between first rack teeth 46a formed on the rack shaft 46 and pinion teeth 42a formed on the pinion shaft 42, rotational motion of the pinion shaft 42 is converted into reciprocating linear motion of the rack shaft 46. The rack shaft 46 is accommodated in a rack housing 44. To both ends of the rack shaft 46, the steered wheels 30 are coupled via tie rods (not depicted). The pinion shaft 42 is coupled to the steering shaft 22 via a clutch 12. The clutch 12 engages and disengages power transmission between the steering shaft 22 and the pinion shaft 42.

The second rack-and-pinion mechanism 52 includes the rack shaft 46 and a pinion shaft 50 that forms a predetermined crossing angle with the rack shaft 46. Second rack teeth 46b formed on the rack shaft 46 mesh with pinion teeth 50a formed on the pinion shaft 50.

The pinion shaft 50 is coupled to a rotary shaft 56a of the steered-side motor 56 via a steered-side reduction gear 54. To the steered-side motor 56, the inverter 58 is connected. To the steering wheel 10, a spiral cable device 60 is coupled. The spiral cable device 60 includes a first housing 62 fixed to the steering wheel 10, a second housing 64 fixed to the vehicle body, a tubular member 66 fixed to the inside of the second housing 64, and a spiral cable 68 wound around the tubular member 66. Through the tubular member 66, the steering shaft 22 is disposed. The spiral cable 68 is an electrical wire that connects between a horn 70 fixed to the steering wheel 10 and, for example, the battery 72 fixed to the vehicle body.

Through the control of the reaction force actuator 20, a control device 80 (steering control device) causes a steering reaction force to be generated in accordance with the operation of the steering wheel 10. Through the control of the steering actuator 40, the control device 80 causes the steered wheels 30 to be steered in accordance with the operation of the steering wheel 10. The control device 80 normally controls steering of the steered wheels 30 in accordance with the operation of the steering wheel 10 while keeping the clutch 12 disengaged.

The control device 80 obtains a rotation angle θs0 of the rotary shaft 26a of the reaction-force motor 26 detected by a steering-side sensor 92 and a steering torque Trqs that is applied to the steering shaft 22 and is detected by a torque sensor 94. The control device 80 obtains a vehicle speed V detected by a vehicle speed sensor 96. The control device 80 controls operation of each switching element provided in the inverter 58. The control device 80 detects a current I supplied to the steered-side motor 56 with a current sensor 58a.

The control device 80 includes a central processing unit (CPU) 82 and a memory 84. The CPU 82 executes a program stored in the memory 84, thereby controlling operation of the reaction force actuator 20 and the steering actuator 40.

Figure 2:
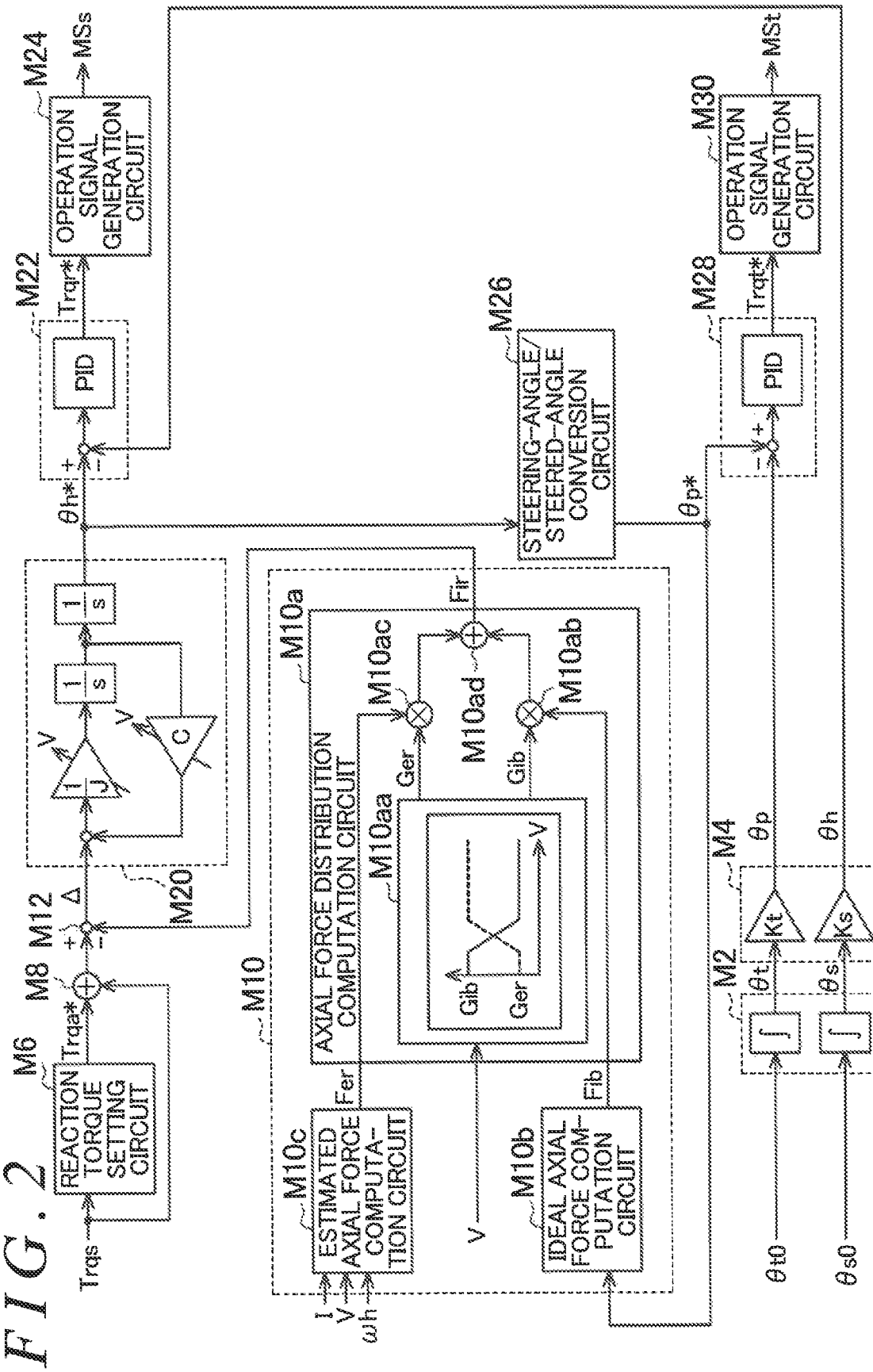
FIG. 2 is a block diagram illustrating the steering control device according to the first embodiment.

The following describes a functional configuration of the control device 80 with reference to FIG. 2. FIG. 2 is a functional block diagram illustrating part of processing that is performed when the CPU 82 executes the program stored in the memory 84.

As depicted in FIG. 2, an integration circuit M2 converts the rotation angle θs0 detected by the steering-side sensor 92 and the rotation angle θt0 detected by a steered-side sensor 90 from relative angles within an angle range of 0 to 360 degrees to absolute angles in an angle range wider than the range of 0 to 360 degrees, thereby obtaining rotation angles θs and θt. For example, when the rotation angles θs0 and θt0 are angles that are made after the steering wheel 10 is turned one rotation from a neutral position where a vehicle can travel straight, 360 degrees are added to or subtracted from each of these angles to obtain the rotation angles θs and θt. For example, when the steering wheel 10 is turned right or left to the maximum from the neutral position where the vehicle can travel straight, the rotary shaft 26a makes a plurality of rotations. Thus, for example, when the steering wheel 10 is turned right or left from the neutral position and the rotary shaft 26a accordingly makes two rotations in a predetermined direction, the integration circuit M2 obtains an output value (rotation angle θs0) of 720 degrees. The integration circuit M2 outputs zero as the rotation angles θs0 and θt0 when the steering wheel is in the neutral position.

A unit-of-measurement setting circuit M4 multiplies the rotation angle θs, as the output value of the steering-side sensor 92 after being processed by the integration circuit M2, by a conversion factor Ks to calculate a steering angle θh. The unit-of-measurement setting circuit also multiplies the rotation angle θt, as the output value of the steered-side sensor 90 after being processed by the integration circuit M2, by a conversion factor Kt to calculate a steered angle θp. The conversion factor Ks is determined according to the rotational speed ratio between the reaction force-side reduction gear 24 and the rotary shaft 26a of the reaction-force motor 26. With this conversion factor, the amount of change in rotation angle θs of the rotary shaft 26a with respect to the position of the rotary shaft 26a when the steering wheel 10 is in the neutral position is converted to a rotation angle θs that is the rotation angle of the steering wheel 10. Thus, the steering angle θh is the rotation angle of the steering wheel 10 with respect to the neutral position. The conversion factor Kt is the product of the rotational speed ratio between the steered-side reduction gear 54 and the rotary shaft 56a of the steered-side motor 56 and the rotational speed ratio between the pinion shaft 50 and the pinion shaft 42. With the conversion factor Ks and the conversion factor Kt, the rotation angle θt that is the rotation amount of the rotary shaft 56a can be converted to the rotation angle θs that is the rotation amount of steering wheel 10 when the clutch 12 is engaged.

The rotation angles θs and θt, the steering angle θh, and the steered angle θp are positive values when the rotary shafts 26a and 56a rotate in a predetermined direction, and are negative values when these rotary shafts rotate in the opposite direction. For example, the integration circuit M2 outputs a negative value when the steering wheel 10 is turned right or left from the neutral position and accordingly the rotary shaft 26a rotates in a direction opposite to the predetermined direction. However, this is merely an example of the logic of the control system.

A reaction torque setting circuit M6 sets a reaction torque Trqa* based on the steering torque Trqs. The reaction torque Trqa* is set to a larger value as the steering torque Trqs increases. An addition circuit M8 adds the steering torque Trqs to the reaction torque Trqa* to calculate the sum.

Based on the current I, a reaction force setting circuit M10 sets a reaction force Fir against the rotation of the steering wheel 10. A subtraction circuit M12 subtracts the reaction force Fir calculated by the reaction force setting circuit M10 from the sum calculated by the addition circuit M8 to calculate a difference Δ therebetween.

A target steering angle calculation circuit M20 sets a target steering angle θh* based on the difference Δ calculated by the subtraction circuit M12. There is a relation between the difference Δ and the target steering angle θh*, which is given by the following formula (1). The target steering angle calculation circuit M20 uses a model formula given in the formula (1) to compute the target steering angle θh*. The symbol "'" in the formula means the derivative term with respect to time.

$$\Delta = C \cdot \theta h^{*\prime} + J \cdot \theta h^{*\prime\prime} \quad (1)$$

The model given by the formula (1) defines the relationship between the torque (difference Δ) and the rotation angle (target steering angle θh*) of the rotary shaft that rotates with rotation of the steering wheel 10 in the configuration in which the steering wheel 10 is mechanically coupled to the steered wheels 30. In the formula (1), the viscosity coefficient C models friction of the steering system, for example. The inertia coefficient J models inertia of the steering system. The viscosity coefficient C and the inertia coefficient J are set to be variable according to the vehicle speed V.

A steering angle feedback circuit M22 sets, as a manipulated variable for feedback controlling the steering angle θh to the target steering angle θh*, a target reaction torque Trqr* that is a target value of reaction torque to be generated by the reaction-force motor 26. Specifically, the steering angle feedback circuit M22 calculates, as the target reaction torque Trqr*, the sum of the respective output values of proportional, integral, and derivative (PID) elements using as an input the difference obtained by subtracting the steering angle θh from the target steering angle θh*.

Based on the target reaction torque Trqr*, an operation signal generation circuit M24 generates an operation signal MSs for the inverter 28. For example, the operation signal generation circuit M24 can compute the operation signal MSs by well-known current feedback control in which a command value for a q-axis current is set based on the target reaction torque Trqr*, and d- and q-axis voltage command values are set as manipulated variables for feedback controlling d- and q-axis currents to their command values. The d-axis current may be controlled to zero. However, when the rotational speed of the reaction-force motor 26 is high, the absolute value of the d-axis current may be set to a value larger than zero to perform field weakening control. The absolute value of the d-axis current may be set to a value larger than zero even in a low rotational speed range. The reaction torque setting circuit M6, the addition circuit M8, the reaction force setting circuit M10, the subtraction circuit M12, the target steering angle calculation circuit M20, the steering angle feedback circuit M22, and the operation signal generation circuit M24 constitute one example of a reaction force processing circuit (torque processing circuit). In particular, the steering angle feedback circuit M22 and the operation signal generation circuit M24 constitute one example of a steering-angle control circuit (rotation angle control circuit). The target steering angle calculation circuit M20 is one example of a target rotation angle computation circuit.

Based on the target steering angle θh* and also based on a steering angle ratio that is a ratio of the steered angle θp to the steering angle θh, a steering-angle/steered-angle conversion circuit M26 calculates a target steered angle θp*. A steered angle feedback circuit M28 sets a target turning torque Trqt* to be generated by the steered-side motor 56 as a manipulated variable for feedback controlling the steered angle θp to the target steered angle θp*. Specifically, the steered angle feedback circuit M28 calculates, as the target turning torque Trqt*, the sum of the respective output values of proportional, integral, and derivative elements using as an input the difference obtained by subtracting the steered angle θp from the target steered angle θp*.

Based on the target turning torque Trqt*, an operation signal generation circuit M30 generates an operation signal MSt for the inverter 58. Generation of the operation signal MSt performed by the operation signal generation circuit M30 can be performed in the same manner as in the generation of the operation signal MSs performed by the operation signal generation circuit M24. The steered angle feedback circuit M28 and the operation signal generation circuit M30 constitute one example of a steered angle control circuit (rotation angle control circuit).

The following describes the reaction force setting circuit M10 in detail. The reaction force setting circuit M10 includes an axial force distribution computation circuit M10a, an ideal axial force computation circuit M10b that computes an ideal axial force Fib, and an estimated axial force computation circuit M10c that computes an estimated axial force Fer.

The ideal axial force computation circuit M10b computes the ideal axial force Fib that is an ideal value of an axial force acting on the steered wheels 30. The ideal axial force computation circuit M10b computes the ideal axial force Fib based on the target steered angle θp*. For example, the ideal axial force Fib is set such that the absolute value of the ideal axial force Fib increases as the absolute value of the target steered angle θp* increases.

The estimated axial force computation circuit M10c computes the estimated axial force Fer (road surface axial force) that is an estimated value of the axial force acting on the steered wheels 30. The estimated axial force computation circuit M10c computes the estimated axial force Fer based on the current I that is the actual current value of the steered-side motor 56, an angular velocity ωh, and the vehicle speed V. The angular velocity ωh is obtained by differentiating the steering angle θh, for example.

The axial force distribution computation circuit M10a computes the reaction force Fir in which the ideal axial force Fib and the estimated axial force Fer are distributed at a predetermined ratio such that the axial force applied from the road surface to the steered wheels 30 is reflected in the reaction force Fir. The axial force applied to the steered wheels 30 is a road-surface reaction force that is transmitted from the road surface to the steered wheels 30.

The axial force distribution computation circuit M10a includes a gain computation circuit M10aa, a multiplication circuit M10ab, a multiplication circuit M10ac, and an addition circuit M10ad. The gain computation circuit M10aa computes a distribution gain Gib and a distribution gain Ger that are distribution ratios for distributing the ideal axial force Fib and the estimated axial force Fer, respectively. The gain computation circuit M10aa computes the distribution gains Gib and Ger based on the obtained vehicle speed V. The distribution gain Gib gradually decreases with increase of the vehicle speed V when the vehicle speed V is higher than a base speed, and soon becomes constant at its lower limit value regardless of the vehicle speed V. The distribution gain Gib is constant at its upper limit value regardless of the vehicle speed V when the vehicle speed V is lower than the base speed. The distribution gain Ger gradually increases with increase of the vehicle speed V when the vehicle speed V is higher than the base speed, and soon becomes constant at its upper limit value regardless of the vehicle speed V. The distribution gain Ger is constant at its lower limit value regardless of the vehicle speed V when the vehicle speed V is lower than the base speed.

The multiplication circuit M10ab multiplies the ideal axial force Fib that is an output value from the ideal axial force computation circuit M10b by the distribution gain Gib. The multiplication circuit M10ac multiplies the estimated axial force Fer that is an output value from the estimated axial force computation circuit M10c by the distribution gain Ger. The addition circuit M10ad adds the product of the ideal axial force Fib and the distribution gain Gib to the product of the estimated axial force Fer and the distribution gain Ger to compute the reaction force Fir. The ideal axial force Fib is an ideal component of the reaction force Fir in which the road-surface reaction force is not reflected. The estimated axial force Fer is a road surface component of the reaction force Fir in which the road-surface reaction force is reflected.

Figure 3:
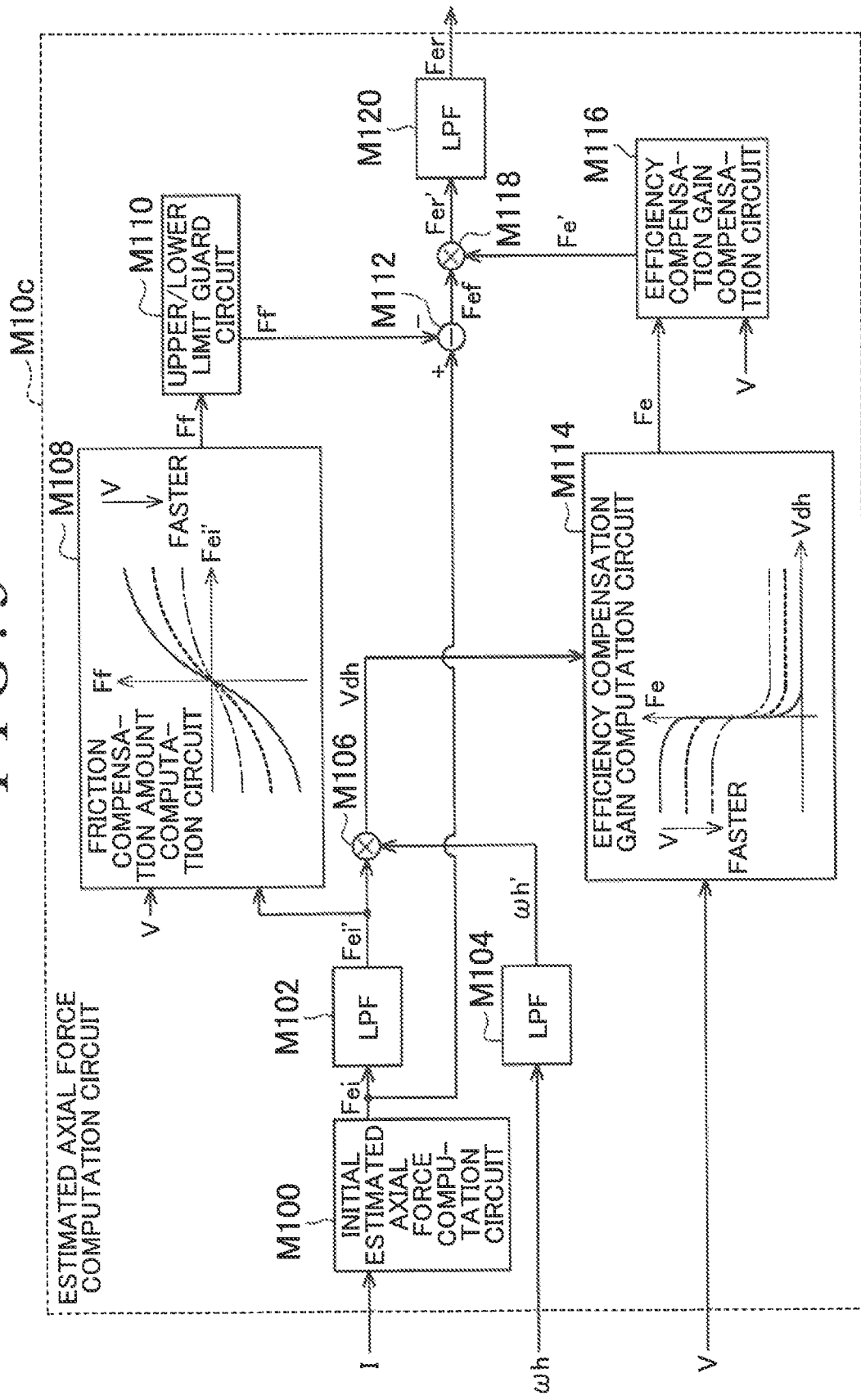
FIG. 3 is a block diagram illustrating an estimated axial force computation circuit of the steering control device according to the first embodiment.

The following describes the estimated axial force computation circuit M10c in detail. As depicted in FIG. 3, the estimated axial force computation circuit M10c includes an initial estimated axial force computation circuit M100, low-pass filters M102, M104, and M120, a multiplication circuit M106, a friction compensation amount computation circuit M108, an upper/lower limit guard circuit M110, a subtraction circuit M112, an efficiency compensation gain computation circuit M114, an efficiency compensation gain compensation circuit M116, and a multiplication circuit M118.

The initial estimated axial force computation circuit M100 obtains the current I that is the actual current value of the steered-side motor 56, and computes an initial estimated axial force Fei based on a q-axis current Iq calculated based on this current I. The q-axis current Iq can be computed by a conversion process into a d- and q-axis coordinate system that is a rotational coordinate system, based on the rotation angle θt0 of the steered-side motor 56. The initial estimated axial force computation circuit M100 multiplies the q-axis current Iq by a predetermined coefficient K to compute the initial estimated axial force Fei.

The predetermined coefficient K is determined based on the gear ratio of the steered-side reduction gear 54, the ratio between torque of the pinion shaft 42 and an axial force of the rack shaft 46, and a torque constant, for example. When an axial force applied to the rack shaft 46 by the steered-side motor 56 and an axial force applied to the steered wheels 30 from the road surface can be considered to be balanced with each other, the axial force applied from the road surface to the steered wheels 30 can be estimated as the estimated axial force Fer based on the q-axis current Iq. This estimated axial force Fer is a component in which at least the road-surface reaction force is reflected.

The low-pass filter M102 (LPF) computes a filtered initial estimated axial force Fei' that is a value obtained by low-pass filtering the initial estimated axial force Fei output by the initial estimated axial force computation circuit M100. The low-pass filter M104 computes a filtered angular velocity ωh' that is a value obtained by low-pass filtering the angular velocity ωh. The angular velocity ωh is the rotational speed of the pinion shaft 42, for example. The multiplication circuit M106 multiplies the initial estimated axial force Fei' computed by the low-pass filter M102 by the angular velocity ωh' computed by the low-pass filter M104 to compute a hysteresis switching determination value Vdh.

The friction compensation amount computation circuit M108 computes a friction compensation amount Ff based on the initial estimated axial force Fei' computed by the low-pass filter M102 and the vehicle speed V. The friction compensation amount computation circuit M108 has a three-dimensional map that defines a relationship between the friction compensation amount Ff, the initial estimated axial force Fei', and the vehicle speed V, and uses the initial estimated axial force Fei' and the vehicle speed V that are input to compute the friction compensation amount Ff based on the map. The friction compensation amount computation circuit M108 computes the friction compensation amount Ff, the absolute value of which increases as the input initial estimated axial force Fei' increases, and as the input vehicle speed V decreases. As the vehicle speed V increases, the rate of change in the friction compensation amount Ff with respect to the change in the initial estimated axial force Fei' decreases. When the initial estimated axial force Fei' is near zero, that is, when the friction compensation amount Ff (initial estimated axial force Fei') is near a region where the sign thereof switch between plus and minus, the change of the friction compensation amount Ff with respect to the change of the initial estimated axial force Fei' is more gradual (the friction compensation amount Ff gradually changes).

Figure 4:
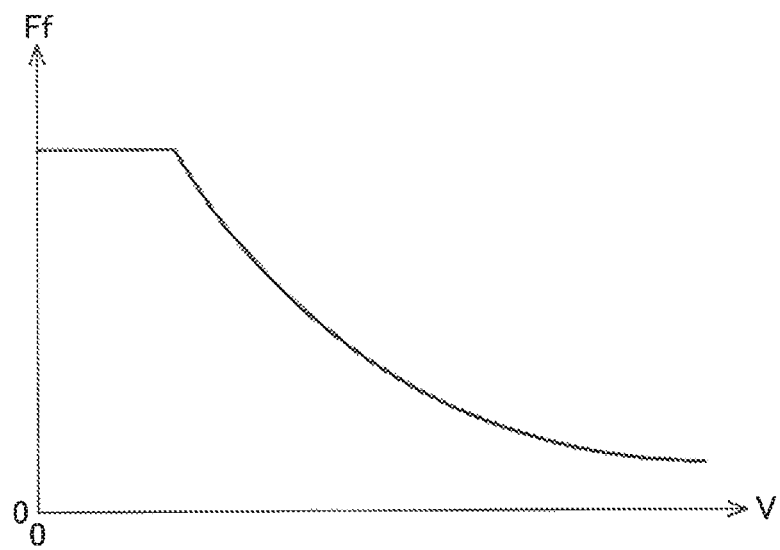
FIG. 4 is a graph illustrating a relationship between vehicle speed and friction compensation amount when an initial estimated axial force is set to a certain value in the first embodiment.

As depicted in FIG. 4, the friction compensation amount Ff hardly changes until the vehicle speed V reaches a set value, and the friction compensation amount Ff decreases as the vehicle speed V increases after the vehicle speed V exceeds the set value.

The upper/lower limit guard circuit M110 compensates the friction compensation amount Ff on the basis of an upper limit value and a lower limit value for the friction compensation amount Ff that are stored in advance. Specifically, when the friction compensation amount Ff is larger than the upper limit value, in order to prevent the friction compensation amount Ff from exceeding the upper limit value, the friction compensation amount Ff is set to the upper limit value, for example. When the friction compensation amount Ff is smaller than the lower limit value, in order to prevent the friction compensation amount Ff from becoming smaller than the lower limit value, the friction compensation amount Ff is set to the lower limit value, for example. Herein, the upper limit value and the lower limit value may be set variable according to various variables such as the vehicle speed V. The upper/lower limit guard circuit M110 computes a friction compensation amount Ff that is compensated based on the upper limit value and the lower limit value.

The subtraction circuit M112 computes a friction-compensated estimated axial force Fef that is a value obtained by subtracting the friction compensation amount Ff computed by the upper/lower limit guard circuit M110 from the initial estimated axial force Fei computed by the initial estimated axial force computation circuit M100.

The efficiency compensation gain computation circuit M114 computes an efficiency compensation gain Fe based on the hysteresis switching determination value Vdh computed by the multiplication circuit M106 and the vehicle speed V. The term "efficiency" means a rate for computing the estimated axial force Fer based on a current flowing in the steered-side motor 56. Normal efficiency and reverse efficiency are defined by the direction of an axial force (actual axial force) that is actually generated in the rack shaft 46 due to the road-surface reaction force and the direction of an axial force that is generated in the rack shaft 46 due to torque applied from the steered-side motor 56 to the rack shaft 46. The efficiency compensation gain computation circuit M114 has a three-dimensional map that defines a relationship between the efficiency compensation gain Fe, the hysteresis switching determination value Vdh, and the vehicle speed V, and uses the hysteresis switching determination value Vdh and the vehicle speed V as input to compute the efficiency compensation gain Fe. The efficiency compensation gain computation circuit M114 computes the efficiency compensation gain Fe, the absolute value of which decreases as the absolute value of the input hysteresis switching determination value Vdh increases, and as the vehicle speed V increases. The efficiency compensation gain Fe when the hysteresis switching determination value Vdh is positive is a value that is smaller than the efficiency compensation gain Fe when the hysteresis switching determination value Vdh is negative. The efficiency compensation gain Fe is always positive regardless of the value of the hysteresis switching determination value Vdh, and decreases as the vehicle speed V increases. When the hysteresis switching determination value Vdh is near zero, that is, when the hysteresis switching determination value Vdh is near a region where the sign thereof switch between plus and minus, the change of the efficiency compensation gain Fe with respect to the change of the hysteresis switching determination value Vdh is gradual (the efficiency compensation gain Fe gradually changes).

Figure 5:
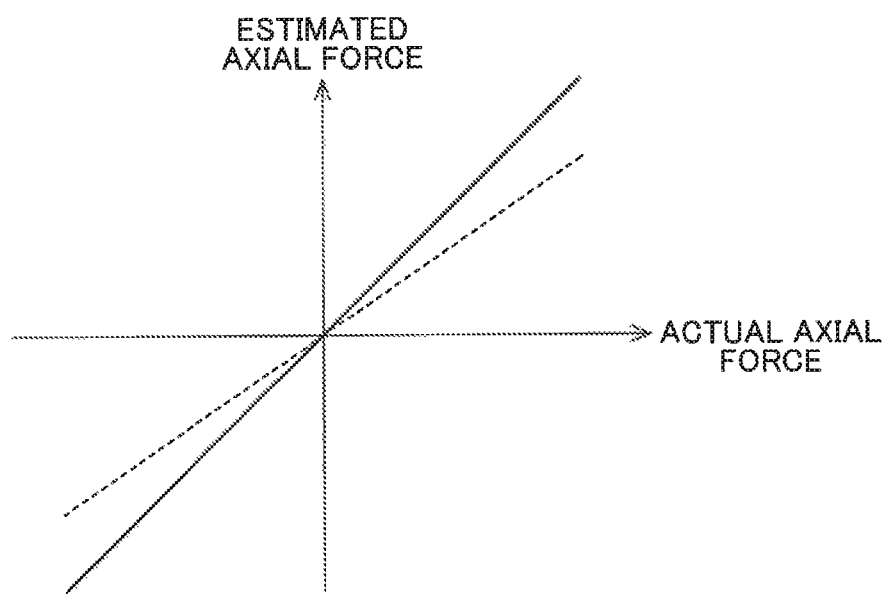
FIG. 5 is a graph illustrating a relationship between estimated axial force on which compensation is not performed by an efficiency compensation gain compensation circuit in the first embodiment and ideal estimated axial force.
Figure 6:
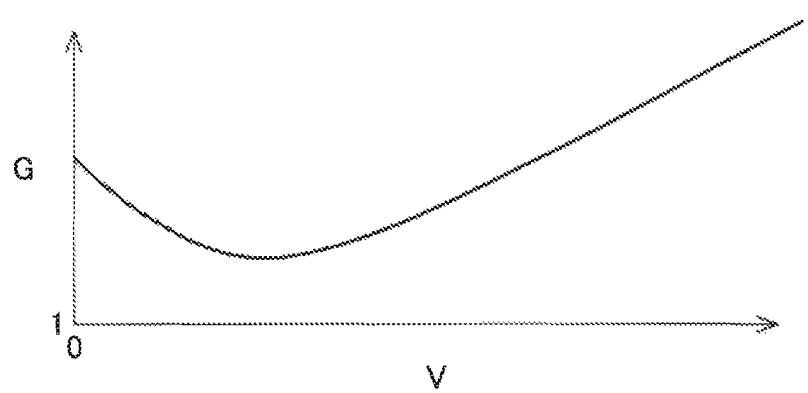
FIG. 6 is a graph illustrating a relationship between vehicle speed and gain for compensating efficiency compensation gain.

The efficiency compensation gain compensation circuit M116 computes a compensated efficiency compensation gain Fe' by compensating the efficiency compensation gain Fe computed by the efficiency compensation gain computation circuit M114 in accordance with the vehicle speed V. This is because if the efficiency compensation gain Fe is not compensated, a situation may occur in which the actual axial force of the rack shaft 46 and the estimated axial force Fer do not correspond to each other on a one-to-one basis even if the initial estimated axial force Fei is friction-compensated and is efficiency-compensated. As one example, in FIG. 5, the estimated axial force Fer when the efficiency compensation gain compensation circuit M116 is not provided and the efficiency compensation gain Fe is not compensated is indicated by the dashed line. In FIG. 5, the continuous line indicates the estimated axial force in which the road-surface reaction force is ideally reflected with respect to the actual axial force of the rack shaft 46. The estimated axial force when the efficiency compensation gain Fe is not compensated by the efficiency compensation gain compensation circuit M116 as depicted in the FIG. 5 deviates because the absolute value thereof is smaller than that of the ideal estimated axial force. Thus, as depicted in FIG. 6, the efficiency compensation gain compensation circuit M116 multiplies the efficiency compensation gain Fe by the gain for example, to compensate the efficiency compensation gain Fe. The gain G decreases as the vehicle speed V increases from zero as a starting point (becomes minimum in a middle-speed range), and then increases as the vehicle speed V increases (in a high-speed range). For example, the gain G is a value larger than one in the entire range of the vehicle speed V.

The multiplication circuit M118 computes an efficiency-compensated estimated axial force Fer' that is a value obtained by multiplying the friction-compensated estimated axial force Fef computed by the subtraction circuit M112 by the compensated efficiency compensation gain Fe' computed by the efficiency compensation gain compensation circuit M116.

The low-pass filter M120 computes a filtered estimated axial force Fer (efficiency-compensated estimated axial force) that is a value obtained by low-pass filtering the efficiency-compensated estimated axial force Fer' computed by the multiplication circuit M118. The estimated axial force Fer computed by the low-pass filter M120 is output to the axial force distribution computation circuit M10a.

The low-pass filters M102 and M104, the multiplication circuit M106, the friction compensation amount computation circuit M108, the upper/lower limit guard circuit M110, the efficiency compensation gain computation circuit M114, and the efficiency compensation gain compensation circuit M116 constitute one example of a determination circuit (characteristic change determination circuit). The subtraction circuit M112 and the multiplication circuit M118 constitute one example of a compensation circuit (estimated axial force compensation circuit). The initial estimated axial force computation circuit M100 is one example of an estimated axial force computation circuit.

According to the present embodiment described above, functions and advantageous effects described below can be obtained.

(1) The efficiency compensation gain Fe computed by the efficiency compensation gain computation circuit M114 is used to perform efficiency compensation for computing the estimated axial force Fer (efficiency-compensated estimated axial force Fer'), whereby the road-surface reaction force that is necessary can be more appropriately reflected in the estimated axial force Fer.

Figure 7:
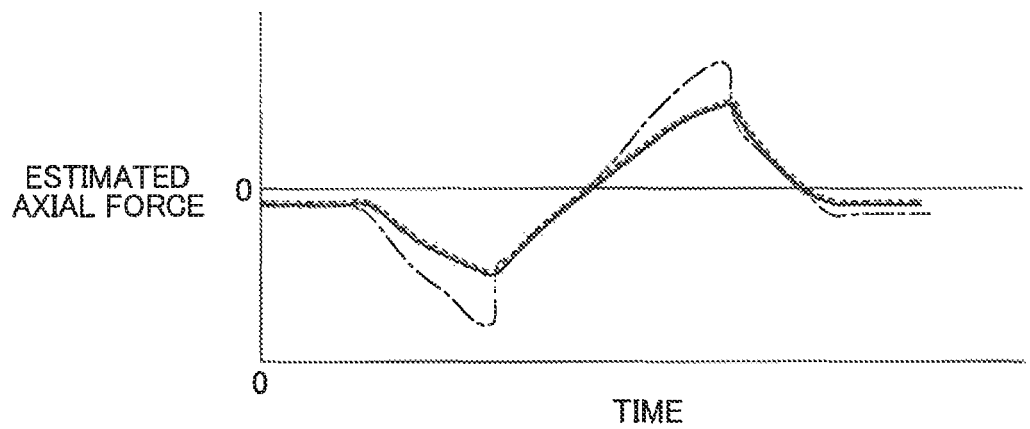
FIG. 7 is a graph illustrating a relationship between time and estimated axial force for each of estimated axial force that is efficiency-compensated, estimated axial force that is not efficiency-compensated, and estimated axial force that ideally matches actual axial force of a rack shaft.
Figure 8:
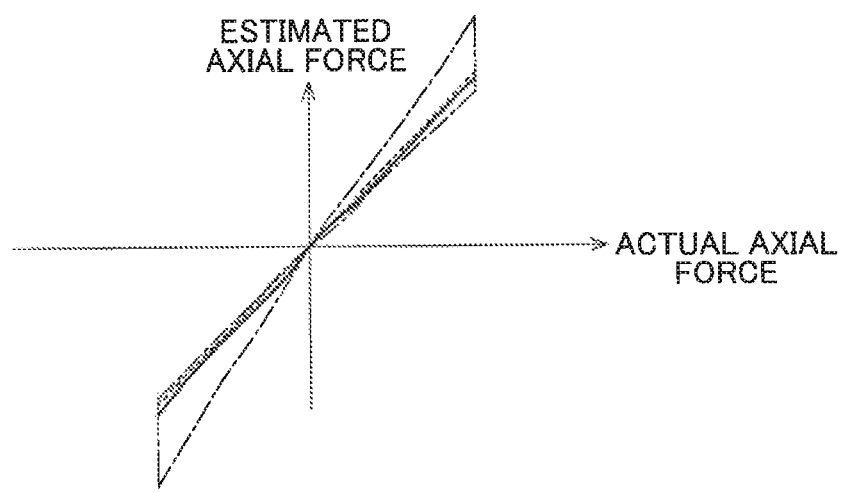
FIG. 8 is a graph illustrating a relationship between actual axial force of the rack shaft and estimated axial force for each of the estimated axial force that is efficiency-compensated, the estimated axial force that is not efficiency-compensated, and the estimated axial force that ideally matches the actual axial force of the rack shaft.

As comparative examples, with reference to FIG. 7 and FIG. 8, an estimated axial force on which the efficiency compensation is not performed, and an ideal estimated axial force for the actual axial force of the rack shaft 46 will be described. In FIG. 7 and FIG. 8, the continuous line indicates temporal change of the estimated axial force Fer on which the efficiency compensation is performed, the dashed line indicates temporal change of the ideal estimated axial force for the actual axial force of the rack shaft 46, and the long dashed short dashed line indicates temporal change of the estimated axial force on which the efficiency compensation is not performed.

The estimated axial force that is ideally computed for the actual axial force acting on the rack shaft 46 corresponds to the actual axial force acting on the rack shaft 46 on a one-to-one basis. Thus, as indicated by the dashed line in FIG. 8, the ideally computed estimated axial force indicates the same value as that of the actual axial force (the slope of the estimated axial force with respective to the actual axial force is one).

In contrast, the estimated axial force on which the efficiency compensation is not performed and that is indicated by the long dashed short dashed line deviates from the ideally computed estimated axial force indicated by the dashed line. This deviation is generated because the estimated axial force in the normal efficiency and the estimated axial force in the reverse efficiency are different. Thus, as indicated by the long dashed short dashed line in FIG. 8, in the estimated axial force on which the efficiency compensation is not performed, hysteresis occurs due to the normal efficiency and the reverse efficiency. Herein, the normal efficiency is efficiency when, for example, the direction of movement of the rack shaft 46 due to rotation of the steered-side motor 56 is the same as the direction of the actual axial force. The reverse efficiency is efficiency when, for example, the direction of movement of the rack shaft 46 due to rotation of the steered-side motor 56 is opposite to the direction of the actual axial force. In other words, the hysteresis due to the normal efficiency and the reverse efficiency occurs because the current Iq based on the actual current value of the steered-side motor 56 is used to compute the initial estimated axial force Fei. Because of the influence of the hysteresis due to the normal efficiency and the reverse efficiency as depicted in FIG. 8, in the estimated axial force on which the efficiency compensation is not performed, the estimated axial force significantly changes in a very short period of time at a point where the estimated axial force becomes maximum, which worsens the steering feeling and the controllability (index of maneuverability how the vehicle can be maneuvered as desired). The target steering angle θh* computed based on the reaction force Fir in which the estimated axial force is reflected varies, and accordingly the steering angle θh that follows the target steering angle θh* by the feedback control also varies. Because of this variation, an appropriate reaction force cannot be applied to the steering wheel 10, which makes the center position of the estimated axial force difficult to be identified, thereby worsening the controllability. Furthermore, if the estimated axial force that is greater or smaller than the actual axial force has been computed, the road-surface reaction force will fail to be appropriately reflected in the target steering angle θh*.

In this regard, in the present embodiment, the efficiency compensation is performed, whereby the estimated axial force Fer on which the efficiency compensation is performed and that is indicated by the continuous line in FIG. 8 is substantially the same as the ideally computed estimated axial force indicated by the dashed line. In other words, because the estimated axial force Fer in which the road-surface reaction force applied from the road surface via the steered wheels 30 is appropriately reflected can be computed, the target steering angle θh* computed based on the reaction force Fir in which the estimated axial force Fer is reflected can be more appropriately computed. Based on this target steering angle θh*, the steering angle θh can be feedback controlled to an angle to which the steering angle should be set. Consequently, with the reaction force applied to the steering wheel 10, a more appropriate road-surface reaction force can be transmitted to the steering wheel 10, and thus the driver can more appropriately grasp the road-surface reaction force. Because the estimated axial force Fer in which the road-surface reaction force is appropriately reflected can be computed, the controllability and the steering feeling can be more satisfactorily improved.

(2) The initial estimated axial force Fei that is computed with the current Iq based on the actual current value of the steered-side motor 56 differs between in the normal efficiency and in the reverse efficiency. In view of this, in order to compute the estimated axial force Fer in which the road-surface reaction force applied from the road surface via the steered wheels 30 is accurately reflected, the efficiency compensation gain Fe depending on the respective efficiencies (the normal efficiency and the reverse efficiency) needs to be multiplied by. However, influence of the initial estimated axial force Fei in each efficiency decreases (the estimated axial force Fer also decreases) as the vehicle speed V increase. Thus, the efficiency compensation gain computation circuit M114 computes the efficiency compensation gain Fe that is set variable according to the vehicle speed V, and thereby being able to compute the estimated axial force Fer in which the road-surface reaction force is more appropriately reflected. Even when the vehicle speed V has changed, a more appropriate efficiency compensation gain Fe can be obtained.

Figure 9:
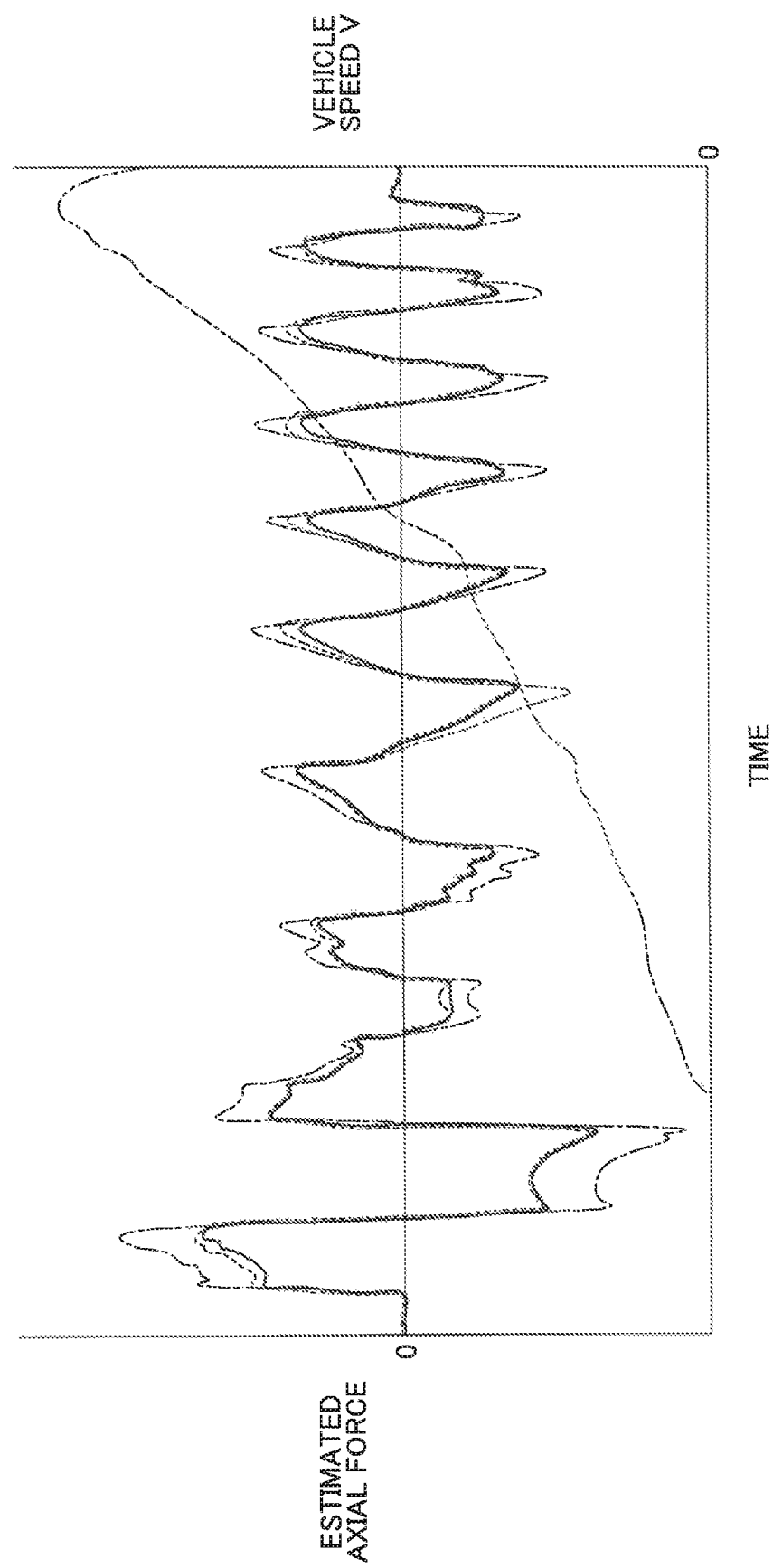
FIG. 9 is a graph illustrating a relationship between time and estimated axial force when the vehicle speed is changed for each of the estimated axial force that is efficiency-compensated, the estimated axial force that is not efficiency-compensated, and the estimated axial force that ideally matches the actual axial force of the rack shaft.

As depicted in FIG. 9, even when the vehicle speed V indicated by the long dashed double-short dashed line changes with time (herein, the vehicle speed V increases), the estimated axial force on which the efficiency compensation is not performed and that is indicated by the long dashed short dashed line deviates from the ideally computed estimated axial force indicated by the dashed line. In contrast, the estimated axial force Fer on which the efficiency compensation is performed and that is indicated by the continuous line is substantially the same as the ideally computed estimated axial force. Thus, the estimated axial force Fer in which the road-surface reaction force is appropriately reflected can be computed.

(3) The steered-side motor 56 steers the steered wheels 30 while overcoming a friction component caused by the rack shaft 46, a suspension, and the steered-side motor 56 itself, for example, in addition to an external force (reverse input)

generated outside the vehicle. In view of this, the initial estimated axial force Fei that is computed with the current Iq based on the actual current value of the steered-side motor 56 is computed while the friction component is included therein. This friction component has characteristics in which the influence thereof decreases as the vehicle speed V increases. Thus, the friction compensation amount computation circuit M108 computes the friction compensation amount Ff that is variable according to the vehicle speed V, thereby computing the estimated axial force Fer in which the road-surface reaction force is more appropriately reflected.

(4) As depicted in FIG. 5, even the estimated axial force that is compensated with the efficiency compensation gain Fe and indicated by the dashed line may have a slope that is different from that of the ideally computed estimated axial force indicated by the continuous line. In view of this, the efficiency compensation gain compensation circuit M116 compensates the efficiency compensation gain Fe in accordance with the vehicle speed V, thereby computing the efficiency compensation gain Fe' for more appropriately reflecting the road-surface reaction force. The estimated axial force that is computed with this efficiency compensation gain Fe' has substantially the same slope as that of the ideally computed estimated axial force indicated by the continuous line in FIG. 5.

(5) The efficiency compensation gain computation circuit M114 and the friction compensation amount computation circuit M108 use the maps in which the efficiency compensation gain Fe and the friction compensation amount Ff gradually change near regions where the signs of the hysteresis switching determination value Vdh and the initial estimated axial force Fei' change between plus and minus to compute the efficiency compensation gain Fe and the friction compensation amount Ff. Thus, even when small noise comes in the hysteresis switching determination value Vdh and the initial estimated axial force Fei', that is, the initial estimated axial force Fei and thereby causes the signs thereof to switch between plus and minus, the efficiency compensation gain Fe and the friction compensation amount Ff that are computed can be prevented from significantly fluctuate.

(6) Because the initial estimated axial force Fei that is a basic component of the estimated axial force Fer is computed with the current Iq based on the actual current value of the steered-side motor 56, the initial estimated axial force Fei can be detected without providing an axial force sensor. In other words, in the configuration for detecting the road-surface reaction force, the necessity of the axial force sensor can be eliminated, which can reduce constituent elements of the steering system.

(7) Because the estimated axial force Fer is computed with the current Iq based on the actual current value of the steered-side motor 56, even in a steer-by-wire system in which the clutch 12 is normally kept disengaged, the estimated axial force Fer in which the road-surface reaction force is reflected can be calculated.

The following describes a second embodiment in which the steering control device is embodied as a control device of an EPS. Herein, differences from the first embodiment are mainly described. Constituent elements that are similar to those of the first embodiment depicted in FIG. 1 are designated by the same numerals for convenience.

Figure 10:
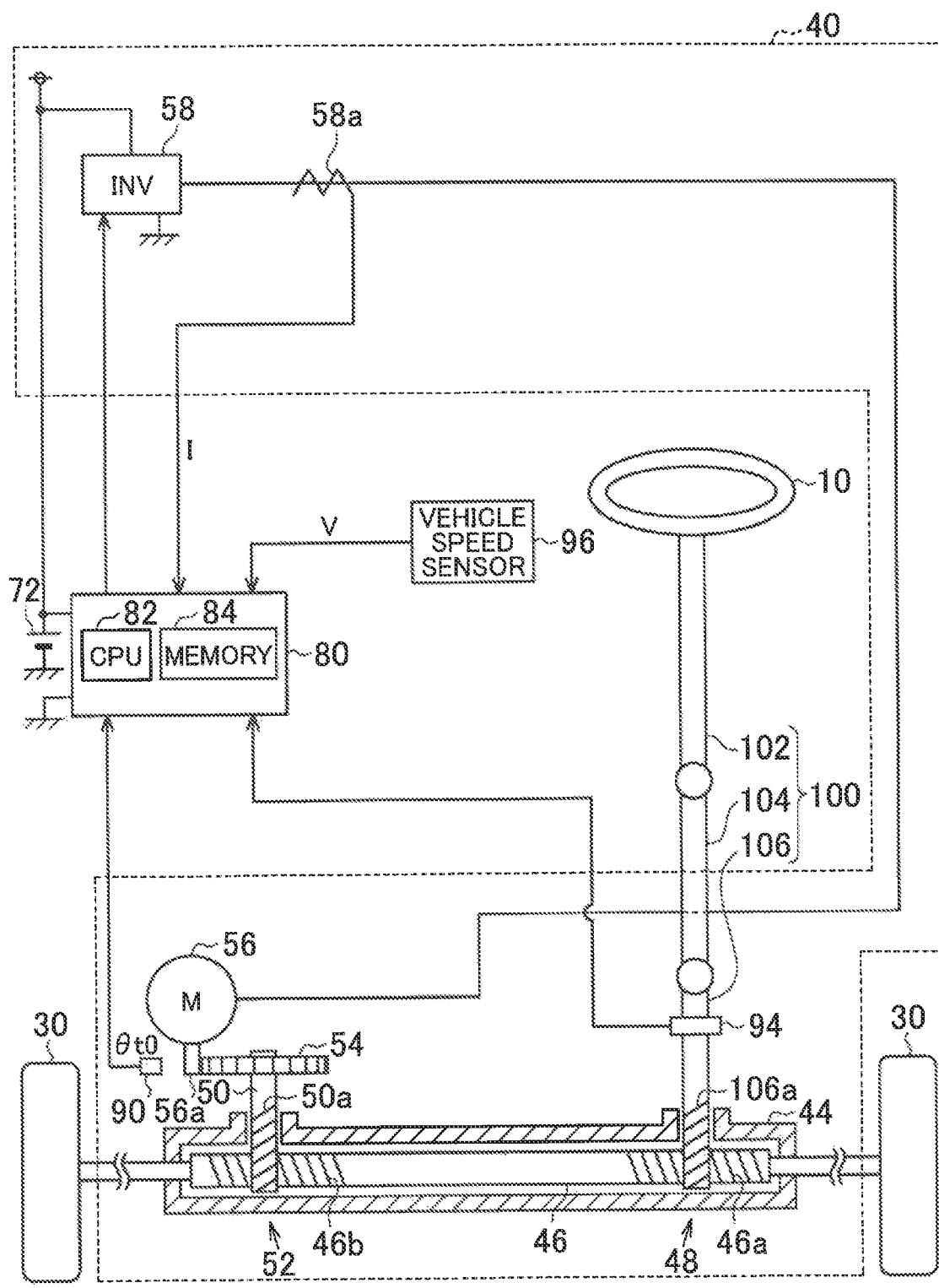
FIG. 10 is a configuration diagram illustrating a steering control device and a steering system according to a second embodiment.

As depicted in FIG. 10, the steering system of the present embodiment is different from the steering system of the first embodiment in that the clutch 12 and the reaction force actuator 20 are not included and the steering wheel 10 is fixed to a steering shaft 100. Thus, in accordance with rotation of the steering wheel 10 and the steering shaft 100, the rack shaft 46 moves in a reciprocating manner in the axial direction. The steering shaft 100 is configured by coupling a column shaft 102, an intermediate shaft 104, and a pinion shaft 106 arranged in this order from the steering wheel 10 side.

The rack shaft 46 and the pinion shaft 106 are disposed so as to form a predetermined crossing angle. The first rack teeth 46a formed on the rack shaft 46 and pinion teeth 106a formed on the pinion shaft 106 that mesh with each other constitute the first rack-and-pinion mechanism 48. Rotational motion of the steering shaft 100 associated with operation of the steering wheel 10 is converted into reciprocating linear motion of the rack shaft 46 in the axial direction by the first rack-and-pinion mechanism 48, whereby the steered angle of the steered wheels 30, that is, the traveling direction of the vehicle is changed.

The control device 80 controls the steering actuator 40 that generates a force for assisting in operation of the steering wheel 10 in accordance with the operation of the steering wheel 10. The torque sensor 94 detects a steering torque Trqs applied to the pinion shaft 106 in the steering shaft 100. The steering actuator 40 is one example of an assist force actuator (actuator).

Figure 11:
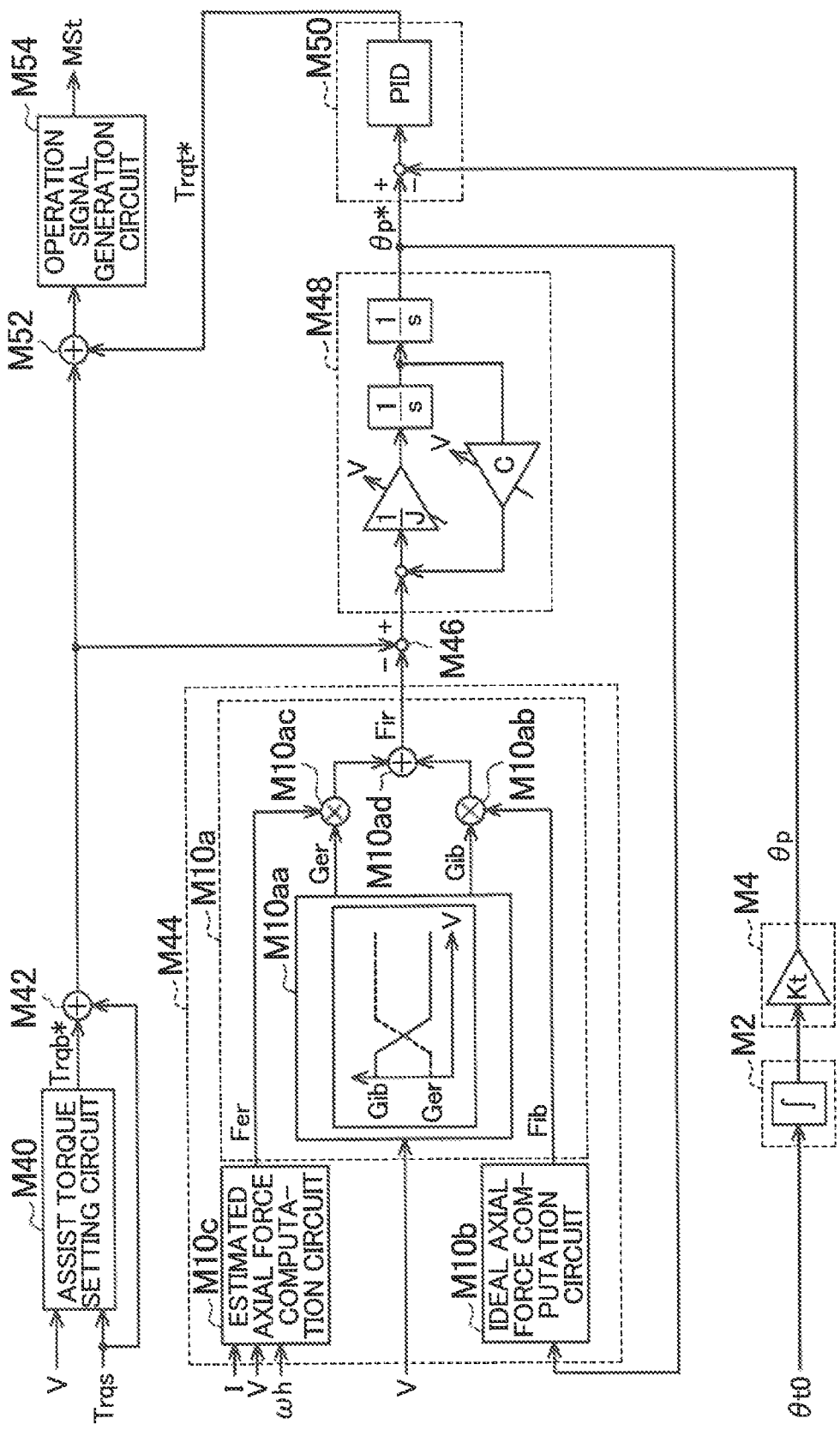
FIG. 11 is a block diagram illustrating the steering control device according to the second embodiment.

The following describes a functional configuration of the control device 80 with reference to FIG. 11. In FIG. 11, blocks corresponding to the blocks illustrated in FIG. 2 are designated by the same numerals for convenience.

The integration circuit M2 converts a rotation angle $\theta t0$ detected by the steered-side sensor 90 to a numerical value in an angle range wider than the range of 0 to 360 degrees, thereby obtaining a rotation angle $\theta t$. The unit-of-measurement setting circuit M4 multiplies the output value of the steered-side sensor 90 after being processed by the integration circuit M2 by the conversion factor Kt to compute a steered angle $\theta p$. The conversion factor Kt is the product of the rotational speed ratio between the steered-side reduction gear 54 and the rotary shaft 56a of the steered-side motor 56 and the rotational speed ratio between the pinion shaft 50 and the pinion shaft 106.

An assist torque setting circuit M40 sets an assist torque Trqb* based on the vehicle speed V and the steering torque Trqs. The assist torque Trqb* is set to a larger value as the steering torque Trqs increases. The assist torque Trqb* is set to a smaller value as the vehicle speed V increases. The assist torque Trqb* is set such that an assist gradient that is a gradient of change with respect to the steering torque Trqs decreases as the vehicle speed V increases. An addition circuit M42 adds the steering torque Trqs to the assist torque Trqb* to output the sum.

A reaction force setting circuit M44 sets a reaction force Fir against the rotation of the steering wheel 10. A deviation calculation circuit M46 outputs a difference obtained by subtracting the reaction force Fir from the output of the addition circuit M42.

Based on this difference $\Delta$ computed by the deviation calculation circuit M46, a target steered angle calculation circuit M48 sets a target steered angle $\theta p^*$. There is a relation between the difference $\Delta$ and the target steered angle $\theta p^*$, which is given by the following formula (2). The target steered angle calculation circuit M48 uses a model formula given in the formula (2) to compute the target steered angle $\theta p^*$. The symbol "'" in the formula means the derivative term with respect to time.

$$\Delta = C \cdot \theta p^{*\prime} + J \cdot \theta p^{*\prime\prime} \tag{2}$$

The model given by the formula (2) is a model that defines the relationship between the torque (difference Δ) and the rotation angle (target steered angle θp*) of the rotary shaft that rotates with rotation of the steering wheel 10. In the formula (2), the viscosity coefficient C and the inertia coefficient J are the same as those in the formula (1).

A steered angle feedback circuit M50 sets, as a manipulated variable for feedback controlling the steered angle θp to the target steered angle θp*, a target turning torque Trqt* to be generated by the steered-side motor 56. Specifically, the steered angle feedback circuit M50 calculates, as the target turning torque Trqt*, the sum of respective output values of proportional, integral, and derivative elements using as an input the difference obtained by subtracting the steered angle θp from the target steered angle θp*. An addition circuit M52 adds the target turning torque Trqt* to the output value (the sum obtained by adding the steering torque Trqs to the assist torque Trqb*) of the addition circuit M42. The steered angle feedback circuit M50 is one example of the steered angle control circuit (rotation angle control circuit).

Based on the output value of the addition circuit M42, an operation signal generation circuit M54 generates an operation signal MSt for the inverter 58 to output this operation signal to the inverter 58. For example, the operation signal generation circuit M54 can compute the operation signal MSt by well-known current feedback control in which a command value for a q-axis current is set based on the sum of the assist torque Trqb*, the steering torque Trqs, and the target turning torque Trqt* as the output value of the addition circuit M52, and d- and q-axis voltage command values are set as manipulated variables for feedback controlling d- and q-axis currents to their command values. The assist torque setting circuit M40, the addition circuit M42, the reaction force setting circuit M44, the deviation calculation circuit M46, the target steered angle calculation circuit M48, the steered angle feedback circuit M50, the addition circuit M52, and the operation signal generation circuit M54 constitute one example of an assist force processing circuit. In particular, the steered angle feedback circuit M50, the addition circuit M52, and the operation signal generation circuit M54 constitute one example of the steered angle control circuit.

The reaction force setting circuit M44 includes the axial force distribution computation circuit M10a, the ideal axial force computation circuit M10b, and the estimated axial force computation circuit M10c. The axial force distribution computation circuit M10a performs computation for setting the reaction force Fir such that the axial force (road-surface reaction force) applied from the road surface to the steered wheels 30 is reflected therein. Based on the target steered angle θp*, the ideal axial force computation circuit M10b calculates an ideal axial force Fib among components of the reaction force Fir. The estimated axial force computation circuit M10c calculates an estimated axial force Fer among the components of the reaction force Fir.

The axial force distribution computation circuit M10a causes the multiplication circuit M10ab to multiply the output value of the ideal axial force computation circuit M10b by a distribution gain Gib. The axial force distribution computation circuit M10a causes the multiplication circuit M10ac to multiply the output value of the estimated axial force computation circuit M10c by a distribution gain Ger. The axial force distribution computation circuit M10a causes the addition circuit M10ad to add the product of the ideal axial force Fib and the distribution gain Gib to the product of the estimated axial force Fer and the distribution gain Ger, thereby calculating and outputting the reaction force Fir.

The respective constituent elements of the estimated axial force computation circuit M10c are the same as those illustrated in FIG. 3. According to the present embodiment described above, in addition to the functions and advantageous effects (3) to (6) of the first embodiment, functions and advantageous effects described below can be obtained.

(8) Because the estimated axial force Fer is substantially the same as the ideally computed estimated axial force when the efficiency compensation is performed, the target steered angle θp* computed based on the reaction force Fir in which the estimated axial force Fer is reflected can be more appropriately computed. Thus, the target steered angle θp* is feedback controlled by the steered angle feedback circuit M50, whereby the steered angle θp can be controlled to an angle to which the steered angle should be set. Consequently, even when an assist force for assisting in operation of the steering wheel 10 is applied, the road-surface reaction force can be more appropriately transmitted to the steering wheel 10, and thus the controllability and the steering feeling can be prevented from deteriorating.

(9) Because the estimated axial force Fer is computed with the current Iq based on the actual current value of the steered-side motor 56, even when the operation of the steering wheel 10 is assisted in, the estimated axial force can be easily computed in consideration of even the influence of the assist force.

The respective embodiments may be modified as follows. The following other embodiments may be combined with each other unless a technical contradiction arises.

In each embodiment, the relationship between each of the distribution gains Gib and Ger and the vehicle speed V may be changed. For example, the distribution gain Gib may decrease as the vehicle speed V increases. The distribution gain Ger may increase as the vehicle speed V increases. In other words, the relationship between each of the distribution gains Gib and Ger and the vehicle speed V may be set in accordance with specifications and use conditions, for example, of the vehicle.

In the first embodiment, the ideal axial force Fib may be calculated by another method. For example, the ideal axial force Fib may be calculated based on parameters other than the target steered angle θp*, such as the target steering angle θh*, the steering torque Trqs, and the vehicle speed V. The same applies to the second embodiment.

In the first embodiment, the estimated axial force Fer may be estimated and computed by another method. For example, the estimated axial force Fer may be computed based on changes in the yaw rate or the vehicle speed. The same applies to the second embodiment.

In each embodiment, the target steering angle calculation circuit M20 or the target steered angle calculation circuit M48 may use a model formula that is modeled by using a spring constant determined based on specifications of the suspension and wheel alignment, for example, that is, by adding so-called a spring term.

In the first embodiment, the steering angle feedback circuit M22 calculates the manipulated variable (target reaction torque Trqr*) for the reaction force actuator 20 based on the sum of the respective output values of proportional, integral, and derivative elements using as an input the difference obtained by subtracting the steering angle θh from the target steering angle θh*. However, the present invention is not limited to this. For example, the steering angle feedback circuit M22 may calculate the target reaction torque Trqr* based on the sum of the respective output values of the proportional and derivative elements or only based on the proportional element using as an input the difference obtained by subtracting the steering angle θh from the target steering angle θh*. In each embodiment, the steered angle feedback circuit M28 or M50 may calculate the manipulated variable (target turning torque Trqt*) for the steering actuator 40 based on the sum of the respective output values of proportional and derivative elements or only based on the proportional element using the difference obtained by subtracting the steered angle θp from the target steered angle θp*.

In the second embodiment, the addition circuit M42 is provided. However, the addition circuit M42 may be omitted. In this case, the deviation calculation circuit M46 and the addition circuit M52 may use only the assist torque Trqb*.

In the second embodiment, the steering torque Trqs is not considered in calculating the estimated axial force Fer. However, the steering torque Trqs may be considered therein. Specifically, the estimated axial force Fer may be obtained by adding the steering torque Trqs to the axial force that is applied to the rack shaft 46 by the steered-side motor 56 and is computed based on the q-axis current Iq. In this case, because the steering torque Trqs is considered, the estimated axial force Fer can be more accurately calculated.

In each embodiment, the estimated axial force Fer is not limited to the value that is computed based on the q-axis current Iq. The axial force applied to the steered wheels 30 may be directly detected by, for example, a pressure sensor that can detect the axial force, and this detection result may be used as the estimated axial force Fer.

In each embodiment, the estimated axial force computation circuit M10c performs friction compensation in addition to the efficiency compensation. However, the present invention is not limited to this. For example, the estimated axial force computation circuit M10c may perform only the efficiency compensation.

In each embodiment, the efficiency compensation gain computation circuit M114 compensates the friction-compensated estimated axial force Fer' (estimated axial force) by multiplication by the efficiency compensation gain Fe (compensated efficiency compensation gain Fe'). However, the present invention is not limited to this. For example, instead of multiplying the friction-compensated estimated axial force Fer' by the efficiency compensation gain Fe, offset compensation (shift compensation) in which a predetermined offset value is added to the friction-compensated estimated axial force Fer' may be performed.

In the first embodiment, the steering angle feedback circuit M22 performs feedback control such that the steering angle θh becomes closer to the target steering angle θh*, and the steered angle feedback circuit M28 performs feedback control such that the steered angle θp becomes closer to the target steered angle θp*. However, the present invention is not limited to this. In the second embodiment, the steered angle feedback circuit M50 performs feedback control such that the steered angle θp becomes closer to the target steered angle θp*. However, the present invention is not limited to this. Specifically, the steering angle feedback circuit M22, the steered angle feedback circuit M28, and the steered angle feedback circuit M50 may perform feedback control based on the rotation angle of a rotary shaft that can be converted to the steering angle θh or the steered angle θp, instead of based on the steering angle θh or the steered angle θp. The steering angle θh or the steered angle θp may be calculated based on the rotation angle of a rotary shaft that can be converted to the steering angle θh or the steered angle θp.

In each embodiment, the axial force distribution computation circuit M10a is provided. However, the present invention is not limited to this. When the axial force distribution computation circuit M10a is not provided, for example, the ideal axial force computation circuit M10b is not provided, and only the estimated axial force computation circuit M10c computes the reaction force Fir to be applied to the steering wheel 10.

In each embodiment, the reaction force actuator 20 and the steering actuator 40 are provided to the steering system. However, any actuator may be provided instead that applies torque to the steering wheel 10 or to a member that is coupled to the steering wheel 10 in an integrally rotatable manner.

In each embodiment, the steering actuator 40 may be any actuator of a rack assist type in which, for example, the steered-side motor 56 is disposed coaxially with the rack shaft 46, or the steered-side motor 56 is disposed parallel to the rack shaft 46.

In the second embodiment, instead of the electric power steering system of a rack assist type, an electric power steering system of a column assist type that applies an assist force to the column shaft 102 of the steering shaft 100 may be constructed. In this case, instead of the steering actuator 40 (steered-side motor 56), an assist force actuator including an assist motor only needs to be provided in a manner mechanically coupled to the steering shaft 100 (the column shaft 102, in particular). Herein, there is a correlation between the rotation angle of the rotary shaft of the assist motor and the steering angle of the steering shaft 100. Accordingly, there is a correlation also between the rotation angle of the rotary shaft of the assist motor and the steered angle of the steered wheels 30. Thus, the control device 80 may cause the integration circuit M2 to process the rotation angle of the rotary shaft of the assist motor detected by a sensor and multiply the processed result by a conversion factor to calculate the steered angle θp. The conversion factor in this case may be a product of the rotational speed ratio between a reduction gear in the assist force actuator and the rotary shaft of the assist motor and the rotational speed ratio between the column shaft 102 and the pinion shaft 106.

In each embodiment, the control device 80 may include dedicated hardware (application-specific integrated circuit (ASIC)) in addition to the CPU 82 and the memory 84. In this case, part of processing of the CPU 82 may be performed by the hardware, and information for the CPU 82 to control operation of the reaction force actuator 20 and the steering actuator 40, for example, may be obtained from the hardware.

What is claimed is:

1. A steering control device that is used as a controller for a steering system including: (i) a rotary shaft that is convertible to a steered angle of a steered wheel that changes with a steering angle of the steering wheel or operation of the steering wheel, (ii) an actuator configured to generate a force to be applied to a steering mechanism of a vehicle, the actuator including a reaction force actuator configured to generate a reaction force against operation of the steering wheel and a steering actuator configured to generate a force for steering the steered wheel, and (iii) a power transmission mechanism engaging and disengaging power transmission between the steered wheel and the steering wheel, in a state in which power transmission between the steered wheel and the steering wheel is disengaged, the steering control device comprising:

a rotation angle control circuit that feedback controls the actuator or the reaction force actuator such that the steering angle of the steering wheel or a rotation angle of the rotary shaft respectively matches a target steering angle that is a target value of the rotation angle;

an estimated axial force computation circuit that computes an estimated axial force in which a road-surface reaction force transmitted from a road surface to the steered wheel is reflected;

a determination circuit that determines a change in characteristic of the estimated axial force;

a compensation circuit that, based on the change in characteristic of the estimated axial force, compensates the estimated axial force so as to remove influence of the change; and a target steering angle computation circuit that computes the target steering angle based on the estimated axial force compensated by the compensation circuit.

2. The steering control device according to claim 1, further comprising:

a steered angle control circuit that feedback controls the steering actuator such that the steered angle computed based on the rotation angle of the rotary shaft that is convertible to the steered angle of the steered wheel matches a target steered angle that is a target value of the rotation angle, wherein the estimated axial force computation circuit computes the estimated axial force based on an actual current value of the steering actuator.

3. The steering control device according to claim 1, wherein the actuator is an assist force actuator configured to generate an assist force for assisting in operation of the steering wheel, the rotation angle control circuit feedback controls the assist force actuator such that the steered angle of the steered wheel or the rotation angle of the rotary shaft that is convertible to the steered angle of the steered wheel matches a target steered angle as the target steering angle, and the target steering angle computation circuit computes the target steered angle as the target steering angle, based on the estimated axial force compensated by the compensation circuit.

4. The steering control device according to claim 3, wherein the estimated axial force computation circuit computes the estimated axial force based on the actual current value of the assist force actuator.

5. The steering control device according to claim 1, wherein the determination circuit determines, as the change in characteristic of the estimated axial force, switching between normal efficiency and reverse efficiency based on change of the estimated axial force in the normal efficiency and change of the estimated axial force in the reverse efficiency, the normal efficiency being efficiency when a direction of an axial force that is caused by a road-surface reaction force transmitted from the steered wheel to a steered shaft is identical to a direction of an axial force that is generated in the steered shaft by torque generated by the actuator, and the reverse efficiency being efficiency when a direction of an axial force that is caused by the road-surface reaction force transmitted from the steered wheel to the steered shaft is opposite to the direction of an axial force that is generated in the steered shaft by torque generated by the actuator, and the compensation circuit compensates the estimated axial force so as to reduce influence of the switching between the normal efficiency and the reverse efficiency, which is the change in characteristic of the estimated axial force.

6. The steering control device according to claim 5, wherein the compensation circuit compensates the estimated axial force by: (i) computing an efficiency compensation gain depending on the switching between the normal efficiency and the reverse efficiency, which is the change in characteristic of the estimated axial force, and (ii) multiplying the estimated axial force by the efficiency compensation gain.

7. The steering control device according to claim 6, wherein the compensation circuit computes a determination value by multiplying the estimated axial force by a pinion angular velocity that is a rotational speed of a pinion shaft as the rotary shaft meshing, in a crossing manner, with the steered shaft to which the steered wheel is coupled, and based on a relationship in which the efficiency compensation gain when the determination value is positive is smaller than the efficiency compensation gain when the determination value is negative, the compensation circuit computes the efficiency compensation gain corresponding to the determination value.

8. The steering control device according to claim 6, wherein the compensation circuit compensates the estimated axial force by: (i) multiplying the efficiency compensation gain computed by a gain in accordance with vehicle speed to compute a compensated efficiency gain, and (ii) multiplying the estimated axial force by the compensated efficiency gain.

9. The steering control device according to claim 1, wherein the compensation circuit compensates the estimated axial force by removing from the estimated axial force a friction component that is generated when the steered wheel is steered.

* * * * *